E. K. BAKER.
SEMIWOOD WHEEL FOR MOTOR VEHICLES.
APPLICATION FILED DEC. 11, 1918.
1,336,338. Patented Apr. 6, 1920.
2 SHEETS—SHEET 1.
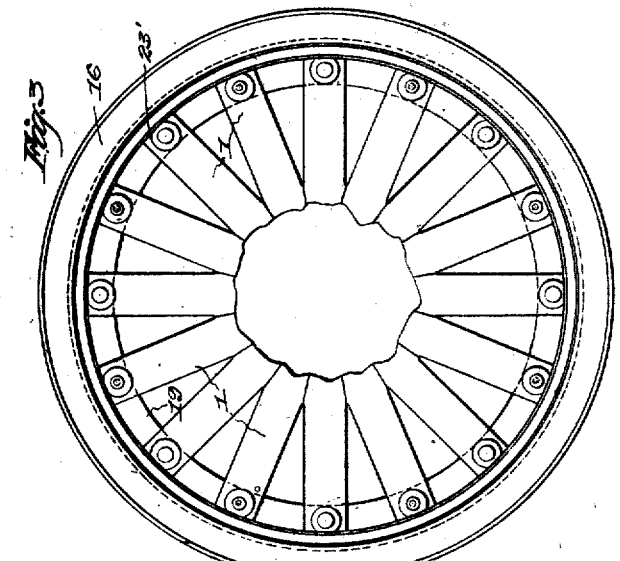
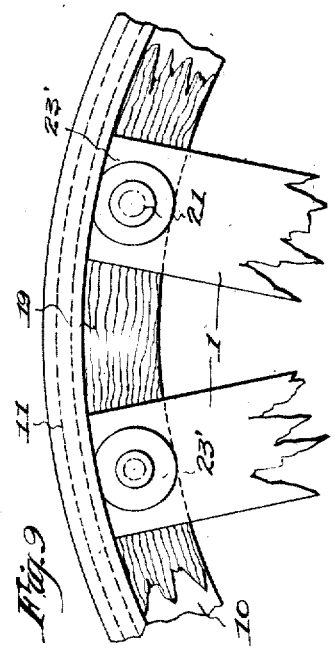
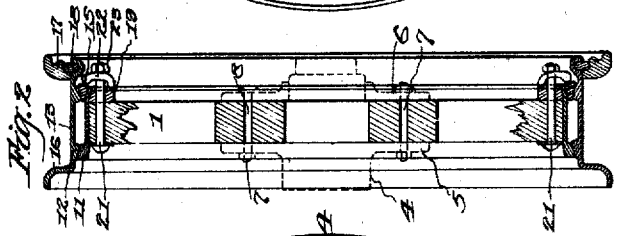
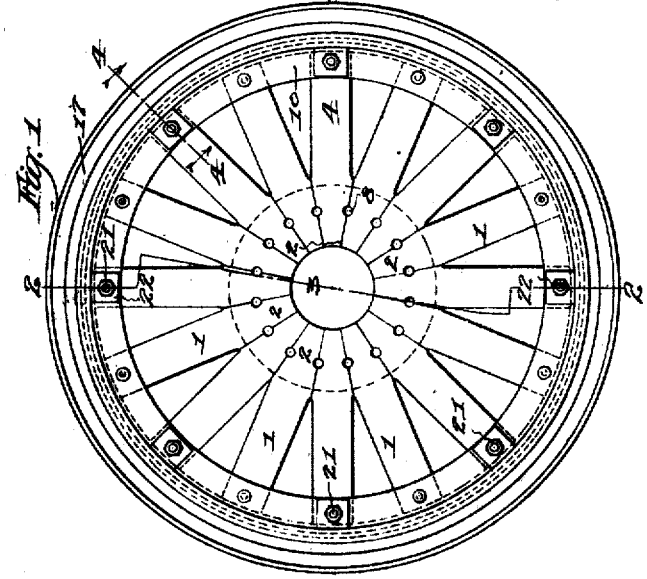
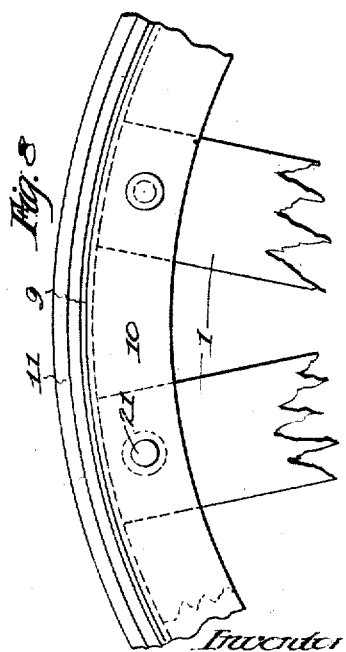
Inventor
Eric K. Baker
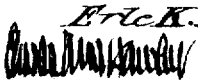

E. K. BAKER.
SEMIWOOD WHEEL FOR MOTOR VEHICLES.
APPLICATION FILED DEC. 11, 1918.
1,336,338.
Patented Apr. 6, 1920.
2 SHEETS—SHEET 2.
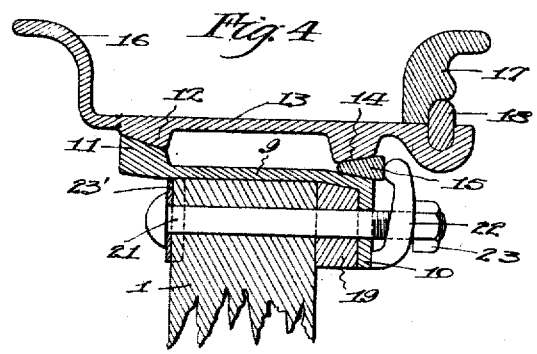
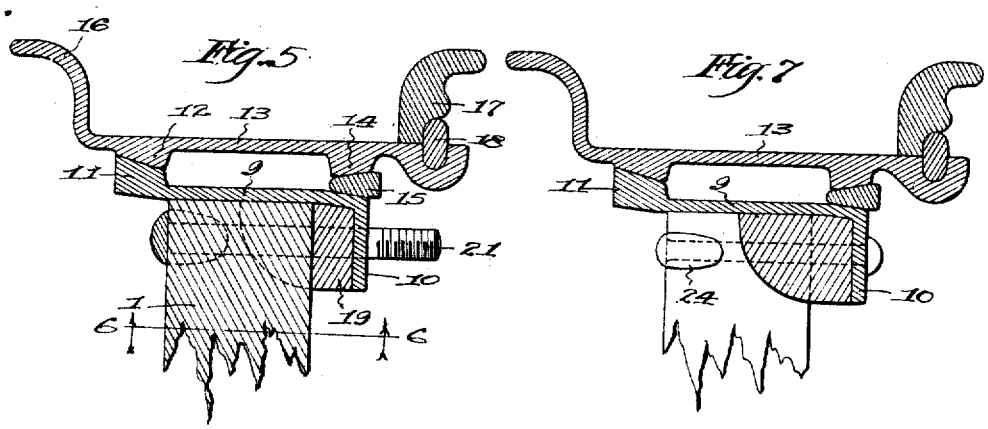
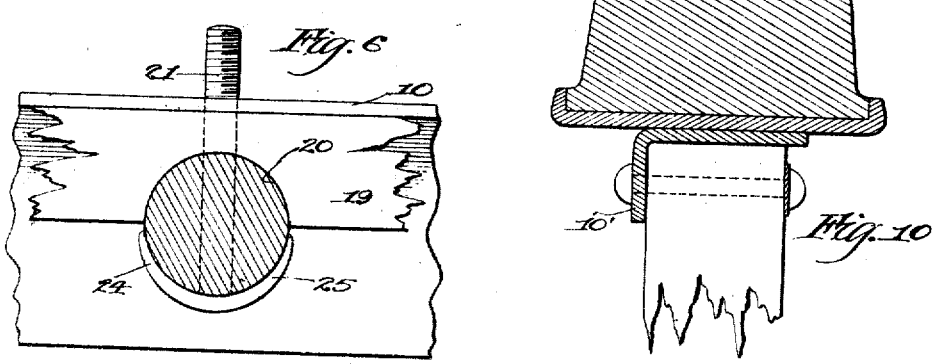

UNITED STATES PATENT OFFICE.

ERLE KING BAKER, OF CHICAGO, ILLINOIS, ASSIGNOR TO BAKER WHEEL & RIM COMPANY, OF CHICAGO, ILLINOIS, A CORPORATION OF ILLINOIS.

SEMIWOOD WHEEL FOR MOTOR-VEHICLES.

1,336,338. Specification of Letters Patent. Patented Apr. 6, 1920.

Application filed December 11, 1918. Serial No. 266,253.

*To all whom it may concern:*

Be it known that I, ERLE K. BAKER, a citizen of the United States, and a resident of Chicago, county of Cook, and State of Illinois, have invented certain new and useful Improvements in Semiwood Wheels for Motor-Vehicles, of which the following is a specification.

My invention relates to improvements in automobile wheels of the type adapted to carry either fixed or demountable rims, and relates more particularly to wheels of a type adapted to the carrying of great loads, such as are met with in motor-truck practice.

While wheels of both metal and wood have been used in motor-vehicle practice, it is quite generally admitted that the wooden wheel has certain advantages that are not to be found in the all-metal wheel. One such desirable feature found in the wooden wheel is that of greater resiliency and the consequent smaller transmission of destructive forces to the axle and other parts of the vehicle. Resiliency in a motor vehicle wheel is particularly necessary where the wheel is provided with a hard or solid rubber tire, because of the excessive vibration which such tires entail. However, it is also quite necessary and desirable, even with the later practice of using large pneumatic tires on motor vehicle wheels, for the reason that the tendency, when using a pneumatic tire, is to operate the vehicle at such an increased rate of speed that the vibration and destructive forces set up, and which must be absorbed to prevent undue injury to the vehicle, are about the same as with a solid-tired wheel.

The prevailing type of wooden wheel is composed of a plurality of wooden spokes radiating from a hub portion outwardly, the ends of the spokes being reduced and tenoned in a heavy wooden felly. The wooden felly, heretofore necessary, must be made of high-grade wood, such as is susceptible of being bent into an arc, constituting a segment of the wheel. Not only is such felly wood scarce, but it is also quite difficult to bend and shape and the operation of making the wheel, as heretofore practised, requires a workman having a relatively high degree of skill.

In order to secure the requisite strength for motor vehicles of large capacity the practice has developed of reducing the size of the wheel. This reduction in the size of the wheel, while providing greater rigidity necessarily has a complementary disadvantage in that it destroys in a large measure the highly desirable resilient features of the wooden wheel. Resiliency is further minimized in the smaller sizes of wheels by the relatively large proportion of the felly to the entire wheel.

Those motor vehicle wheels designed for pneumatic tires are smaller in proportion to the size of the pneumatic tire employed. That is to say, the larger the size of the tire the smaller the diameter of the wooden wheel and hence the less resiliency in the wheel.

If it be attempted to secure the requisite resiliency in the wood wheel by providing relatively long spokes, even assuming that other factors do not prohibit such a design, another difficulty is at once encountered. That is to say, while a short spoke composed of an ordinary grade of wood furnishes the requisite strength, a long spoke would require a very high grade of wood, so much so that it would have to be selected stock, which would add greatly to the cost of the wheel.

One of the difficulties that develops in the use of the wooden wheel as heretofore made, is that of looseness between the parts, usually between the spokes and the felly. So soon as a slight looseness develops, vibrations are set up which, in a short time, grow to such proportions as to be quickly and violently destructive of the whole wheel.

The general object of my invention is to provide a motor-vehicle wheel abundantly able to withstand the forces to which it is subjected in use and yet of such a resilient character as to be of practical assistance in absorbing road shocks.

A further object of my invention is to provide a motor-vehicle wheel of a strong but resilient character, which shall be adapted to the carrying of either a solid or pneumatic tire.

Again it is an object of my invention to provide a motor vehicle wheel of such construction that the hitherto individualistic and highly skilled manufacture and assembly of each wheel can be reduced to a factory system in which the spokes can be manufactured in a convenient, simple, and rapid manner, and thereafter easily assembled, by unskilled labor, with the other parts necessary to provide a strong and durable, yet resilient, wheel.

A detailed object of the present invention is to provide a motor-vehicle wheel, and a method of manufacturing the same, which shall be adapted to embodiment in a so-called wide rim wheel, such as is commonly found in pneumatically tired vehicle wheels.

My invention consists generally in a motor vehicle wheel, and in the method of producing the same, whereby the above named objects and purposes, together with a number of others that will appear hereinafter, are attained, and my invention will be more readily understood by reference to the drawings, wherein I have depicted what I now consider to be the preferred embodiment thereof, but which, it should be understood, is by way of illustration and not by way of limitation.

In the drawings: Figure 1 is a side elevation showing the obverse side of a wheel embodying my invention;—Fig. 2 is a section taken on the line 2—2 of Fig. 1;—Fig. 3 is a view similar to Fig. 1, but showing the reverse side of the wheel;—Fig. 4 is a sectional view on the line 4—4 of Fig. 1;—Fig. 5 is a sectional view, similar to Fig. 4, but showing a slightly modified form of my invention (the clamping lug and nut being omitted);—Fig. 6 is a sectional view on line 6—6 of Fig. 5;—Fig. 7 is a sectional view similar to Fig. 5, but taken adjacent an alternate spoke;—Figs. 8 and 9 show fragmentary sectional detailed views of the connection between the spokes and outer structure and showing opposite sides;—Fig. 10 is a transverse section through the rim supporting band of a modified form having a fixed rim thereon.

Referring to the drawings, and particularly Figs. 1 and 3, it will be observed that the body of the wheel comprises a plurality of wooden spokes, 1, having mitered ends, 2, adapted to be tightly wedged together and thereby defining the hub hole 3. To the hub of the wooden part may be secured the metallic hub, 4, of usual construction, and shown only by dotted lines in the drawing. The metallic hub, 4, is provided with a flange, 5, on one side and upon the opposite side will be found a slip-flange, 6. The metallic hub parts are rigidly secured to the hub of the wheel, i. e., that portion formed by the portion, 2, of the spokes by means of suitable bolts, 7, passing through holes, 8. I have designedly provided a much larger number of spokes, 1, than is customary for the purpose of serving a number of highly important and desirable functions. By providing a relatively large number of spokes, 1, I am enabled to provide a relatively large wooden hub portion, such as is indicated by the dotted circle in Fig. 1 to which the letter "H" has been applied, and since the strength of a wooden wheel is largely determined by the size of the hub portion, I have provided a wheel of sufficient strength to be employed in even the heaviest types of vehicle wheels.

As will be observed, I have entirely eliminated the old form of wooden felly with its expensive, short-lived mortise and tenoned connection with the spoke ends, and employ only a metal band, 9. As a matter of convenience, I shall term this band a "peripheral band." The peripheral band is preferably formed by bending a flat metal strip, having a flange on one edge, and a rim seat upon the other, into circular shape, so that the flange extends inwardly and the rim seat faces outwardly. The peripheral band may be formed of various cross-sections by well-known rolling processes, after which the rolled metal may be cut into desired lengths, shaped to cylindrical form, and the ends joined as by welding. When completed it presents an inwardly extending flange, 10, and an outward or peripheral seat portion, 11, upon which may be seated the tire rim, 13, by the coaction of beveled portions, 12 and 14, thereof, with the beveled portion, 11, of the peripheral band and the beveled wedge ring, 15. It will be understood that the tire-containing rim is of the so-called demountable construction in which the rim, 13, is seated by the movement axially of the wheel. The pneumatic tire (not shown) is held in place on the rim 13, by means of the integral flange, 16, at one side and the detachable flange, 17, at the other side, the detachable flange being held in place, as by the split ring, 18. Since these parts are of well-known construction, their various functions will not be dwelt upon.

I have so far stated that the peripheral band is provided, but I have not stated how it is joined to the spokes as it must be, in order to form a union of such tenacity as will resist relative circumferential movement between the body of the wheel and the peripheral flange. This union may be secured in various ways, as for example, by forcing the spokes of the wheel into the band by means of an enormous lateral pressure, or by expanding the band as by heating, slipping the band in its heated condition over the spokes, so that upon contraction the band will be firmly seated upon the ends of the spokes in such a tensional condition that the wooden body of the wheel will be under such compression as will firmly hold the various spokes against loosening in use. By properly proportioning the size of the band, to the periphery of the spoke ends such a firm union can be secured by the contraction of the band upon the spoke ends that this connection alone will be amply sufficient as a driving connection between the body of the wheel and the peripheral band, such as will prevent relative circumferential movement of the parts. This is particularly so when square spokes are used, such as is shown in the principal figures in full lines. Such spoke ends obviously provide a larger surface of contact than would a round spoke.

I wish here to direct attention to the additional function of the multiplicity of spokes in further augmenting the already large peripheral band contacting surface, which in turn constitutes a union between the spokes and peripheral band of a tenacity abundantly able to constitute a driving connection. Thus appears another valuable function of the large number of spokes that I prefer to use. It should also be noted that in the formation of the square spoke, it is merely necessary to miter the ends of various spokes, and this in turn simplifies the operation as it can be sawed and planed from stock sizes of material with standard sawing and planing machinery, and as easily mitered in like manner. The relatively slow and laborious method of turning down the outer ends of the spokes is thus eliminated.

As a matter of precaution I provide additional means for joining the spokes and the peripheral band. These means take the form of bolts, 21, which are passed through alined openings in the spokes and in the flange, 10, of the peripheral band.

In that form of my invention shown in Fig. 10, the spoke ends contact the inwardly extending flange marked 10' of the peripheral band. In the other forms of my invention, which are designed or adapted to the seating of a wide tire rim, such as is used with the large pneumatic tires, I interpose a spacing ring, 19, between the flange, 10, and the spokes, to the end that the peripheral band may be easily and cheaply positioned centrally of the wooden wheel. While the spacing ring, 19, may be composed of various materials, I prefer that it shall be made of wood, as wood is at once relatively light, thus cutting down the peripheral weight of the wheel, and at the same time is of sufficient strength to resist those compressive forces to which it will be subjected in use. It should be understood that the ring, 19, is a mere spacing ring, and does not in any sense act as a felly to support the peripheral band, 9, and for this reason the wooden ring. 19, need not be of selected or high-grade wood, such as is absolutely necessary in the felly band of the hitherto usual construction.

When the spokes are round (in the modification shown in Figs. 5, 6, and 7) the spacing band, 19, is preferably provided with notches, 20, thereby encircling a substantial part of the end of the spoke.

In those forms of my invention in which the spacing ring, 19, is employed, the bolts, 21, passing through the alternate spokes also pass through suitably alined openings in the usual ring, 19. As a matter of practice, the fastening devices, 21, of alternate spokes are preferably rivets, and of the intermediate spokes bolts of sufficient length so that a clamping lug, 22, and an operating nut, 23, may be mounted thereon. The purpose of the members 22 and 23 obviously is that of wedging the tire-containing rim, 13, in place, and since this function is well-known it will not be discussed in detail. It might be stated, however, that the bolts, 21, when tightened, serve as additional driving connections tying the spokes to the peripheral band. The head of the bolts may either assume the usual form and be provided with a washer, 23, or they may consist of oppositely projecting curved extensions, 24 and 25, such as best shown in Figs. 5, 6, and 7.

Except where a demountable rim requires wedges or lugs at certain spokes, every spoke may contain a rivet or like fastening, and it will be understood that if desired the bolts and wedge lugs may be arranged at places other than the spokes, but I do not favor such a structure.

I desire to call attention to another function served by the large number of spokes, and that is, that the peripheral band in being tensioned upon the spokes is supported at such a large number of points that I am enabled to provide a finished wheel that is truly cylindrical and not polygonal. I am also enabled to shrink the band more firmly upon the spoke ends, without danger of distortion and thereby set the body of the wheel in such a state of compression as will successfully defy any forces tending to loosen or separate the parts in use. Obviously by dispensing with the felly, there are fewer parts in the assembled wheel and hence fewer joints that can loosen in any event, and the very parts that give the most trouble in use, to-wit, the tenoned and the mortised joint, is eliminated. Again, by tightly tensioning the peripheral band upon the spoke ends, I effectually seal the ends of the spokes against the entrance of foreign matter and thereby prolong the life and the durability of the spokes.

Dispensing with the wooden felly as I do, I am enabled to provide a relatively large wooden hub portion in the wheel, such as will give the requisite strength even for motor trucks of large capacity. At the same time I provide a projecting spoke of a length sufficient to be actually resilient, even where the wheel, as a whole, is of relatively small diameter, such as is the case when employed in conjunction with a large pneumatic tire. I thus not only provide a strong, yet resilient wheel, but I also provide one in which the spoke portions projecting from the hub are not of undue length and can, therefore, be made of ordinary wood and yet be of requisite strength.

This rather detailed description has been made for the reason that the elements entering into and the factors governing the construction of my wheel are not readily apparent and might otherwise be overlooked or misunderstood.

I claim—

1. A semi-wood wheel, comprising a plurality of radial wooden spokes, a peripheral metal band tightly fitting over the ends of the spokes and having an inwardly extending flange, and means spacing the inwardly extending flange from the spokes.

2. A semi-wood wheel, comprising a plurality of radial wooden spokes, a peripheral metal band tensionally engaging the spoke ends with force sufficient to form a driving connection, and having an inwardly extending flange, and means spacing the inwardly extending flange from the spokes.

3. A semi-wood wheel having radial wooden spokes, a peripheral metal band, of sufficient width to receive a demountable rim, tightly fitting over the spoke ends and having an inwardly extending flange, said spokes being of less width than the peripheral band, and means interposed between and spacing the spokes from the inwardly extending flange.

4. A semi-wood wheel having radial wooden spokes, a peripheral metal band, of sufficient width to receive a demountable rim, fitting over the spoke ends, under tension sufficient to form a driving connection, and having an inwardly extending flange, said spokes being of less width than the peripheral band, and means interposed between and spacing the spokes from the inwardly extending flange.

5. A semi-wood wheel having radial wooden spokes, a cylindrical metal band, of sufficient width to receive a demountable rim fitting over the spoke ends, under tension sufficient to form a driving connection, and having an inwardly extending flange, said spokes being of less width than the peripheral band, and means interposed and spacing the spokes from the inwardly extending flange.

6. A semi-wood wheel having radial wooden spokes of rectangular cross-section and substantially uniform thickness from end to end, the inner ends being mitered to permit radial positioning and a peripheral metal band encompassing and tensionally gripping the spoke ends, said peripheral band having an inwardly extending flange, and spacing means interposed between the flange and the spokes.

7. A semi-wood wheel having a plurality of radial wooden spokes, a rim-receiving metal band tightly fitting over the ends of the spokes and having an inwardly extending flange, means interposed between and spacing the flange from the spokes and means for securing the flange, spacing means, and spokes firmly together.

8. In a semi-wood wheel having a plurality of radial wooden spokes, a demountable rim-receiving metal band tightly fitting over the ends of the spokes and having an inwardly extending flange, means interposed between and spacing the flange from the spokes, and means for securing the flange spacing means and spokes firmly together, said means comprising rivets, except where demountable rim-operating parts are positioned at which place the fastening means take the form of bolts.

In testimony whereof I have hereunto set my hand this 25th day of November, 1918.

ERLE KING BAKER.